United States Patent
Yin et al.

(10) Patent No.: US 11,525,902 B2
(45) Date of Patent: Dec. 13, 2022

(54) TIME-OF-FLIGHT RANGING DEVICE SUITABLE FOR INDIRECT TIME-OF-FLIGHT RANGING

(71) Applicant: Guangzhou Tyrafos Semiconductor Technologies Co., LTD, Guangzhou (CN)

(72) Inventors: Ping-Hung Yin, Taipei (TW); Jia-Shyang Wang, Miaoli County (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 335 days.

(21) Appl. No.: 16/905,918

(22) Filed: Jun. 19, 2020

(65) Prior Publication Data
US 2020/0400793 A1    Dec. 24, 2020

Related U.S. Application Data

(60) Provisional application No. 62/864,516, filed on Jun. 21, 2019.

(51) Int. Cl.
*G01S 17/10*    (2020.01)
*G01S 7/481*    (2006.01)
(Continued)

(52) U.S. Cl.
CPC ............ *G01S 7/4865* (2013.01); *G01S 7/484* (2013.01); *G01S 7/4808* (2013.01);
(Continued)

(58) Field of Classification Search
CPC .... G01S 7/4865; G01S 7/4808; G01S 7/4816; G01S 7/484; G01S 7/4861; G01S 7/4863;
(Continued)

(56) References Cited

U.S. PATENT DOCUMENTS

| 2011/0211100 A1* | 9/2011 | Yin ...................... H04N 5/2355 348/300 |
| 2016/0133659 A1* | 5/2016 | Chao ..................... H01L 27/146 257/225 |

(Continued)

FOREIGN PATENT DOCUMENTS

| CN | 1991407 | 7/2007 |
| CN | 108780151 | 11/2018 |

(Continued)

OTHER PUBLICATIONS

"Office Action of Taiwan Counterpart Application", dated Jan. 13, 2022, p. 1-p. 9.

*Primary Examiner* — Jennifer D Bennett
*Assistant Examiner* — Erin R Garber
(74) *Attorney, Agent, or Firm* — JCIPRNET

(57) ABSTRACT

A time-of-flight ranging device suitable for indirect time-of-flight ranging is provided. The time-of-flight ranging device includes a light emitting module, a first sensing pixel, a second sensing pixel, a differential readout circuit, and a processing circuit. The light emitting module emits a light pulse to a sensing target, so that the sensing target reflects a reflected light pulse. The first sensing pixel generates a first sensing signal and a second sensing signal. The second sensing pixel generates a third sensing signal and a fourth sensing signal. The differential readout circuit generates first digital data according to the first sensing signal and the third sensing signal and generates second digital data according to the second sensing signal and the fourth sensing signal. The processing circuit calculates a distance between the time-of-flight ranging device and the sensing target according to the first digital data and the second digital data.

20 Claims, 4 Drawing Sheets

(51) Int. Cl.
*G01S 7/4863* (2020.01)
*G01S 7/4865* (2020.01)
*G01S 7/4861* (2020.01)
*G01S 7/484* (2006.01)
*G01S 17/894* (2020.01)
*G01S 7/48* (2006.01)
*G01S 17/14* (2020.01)

(52) U.S. Cl.
CPC .......... *G01S 7/4816* (2013.01); *G01S 7/4861* (2013.01); *G01S 7/4863* (2013.01); *G01S 17/10* (2013.01); *G01S 17/894* (2020.01); *G01S 17/14* (2020.01)

(58) Field of Classification Search
CPC ........ G01S 17/10; G01S 17/894; G01S 17/14; H04N 5/378; H04N 13/254; H04N 13/243; H04N 9/045; H04N 5/369; H04N 5/372; H04N 5/3698; H04N 5/37455; H04N 5/3745; H04N 5/37452
See application file for complete search history.

(56) References Cited

U.S. PATENT DOCUMENTS

2018/0367748 A1* 12/2018 Mayer .................. H04N 5/3743
2019/0179017 A1   6/2019 Nagai
2019/0287256 A1*  9/2019 Iwahashi ................. G06T 7/521
2019/0288020 A1*  9/2019 Ikuma ................ H04N 5/35563

FOREIGN PATENT DOCUMENTS

CN      109684907       4/2019
WO      2017145450      8/2017

* cited by examiner

TIME-OF-FLIGHT RANGING DEVICE SUITABLE FOR INDIRECT TIME-OF-FLIGHT RANGING

CROSS-REFERENCE TO RELATED APPLICATION

This application claims the priority benefits of U.S. provisional application Ser. No. 62/864,516, filed on Jun. 21, 2019. The entirety of the above-mentioned patent application is hereby incorporated by reference herein and made a part of this specification.

BACKGROUND

Technical Field

The disclosure relates to a ranging technology, and in particular to a time-of-flight ranging device.

Description of Related Art

During indirect time-of-flight ranging performed by a common time-of-flight ranging device, if background light is strong and is changed with time (with no fixed value), the time-of-flight ranging device may not be able to easily lessen or eliminate the impact of the background light in sensing results of the indirect time-of-flight ranging. Although the common time-of-flight ranging device can perform additional background light sensing to obtain background information for reducing or eliminating the impact of the background light in the sensing results of the indirect time-of-flight ranging, due to the long time interval between the background light sensing and the ranging sensing by the common time-of-flight ranging device, the obtained background information cannot be effectively used to lessen or eliminate the impact of the background light in the sensing results of the indirect time-of-flight ranging. In addition, in the event of the strong background light, the common time-of-flight ranging device has the defect of insufficient dynamic range. In view of the above, several solutions described in the embodiments below are proposed.

SUMMARY

The disclosure provides a time-of-flight ranging device suitable for indirect time-of-flight ranging, which may effectively sense a distance between the time-of-flight ranging device and a sensing target.

According to an embodiment of the disclosure, a time-of-flight ranging device is suitable for indirect time-of-flight ranging. The time-of-flight ranging device includes a light emitting module, a first sensing pixel, a second sensing pixel, a differential readout circuit, and a processing circuit. The light emitting module is configured to emit a light pulse to a sensing target, so that the sensing target reflects a reflected light pulse. The first sensing pixel is configured to respectively perform sensing in a first cycle in a first frame period and a second cycle in a second frame period to respectively generate a first sensing signal and a second sensing signal. The second sensing pixel is configured to respectively perform sensing in a third cycle in the first frame period and a fourth cycle in the second frame period to respectively generate a third sensing signal and a fourth sensing signal. The differential readout circuit is coupled to the first sensing pixel and the second sensing pixel. The differential readout circuit is configured to generate first digital data according to the first sensing signal and the third sensing signal in the first frame period and generate second digital data according to the second sensing signal and the fourth sensing signal in the second frame period. The processing circuit is coupled to the differential readout circuit. The processing circuit is configured to calculate a distance between the time-of-flight ranging device and the sensing target according to the first digital data and the second digital data.

According to an embodiment of the disclosure, a time-of-flight ranging device is suitable for indirect time-of-flight ranging. The time-of-flight ranging device includes a light emitting module, a first sensing pixel, a second sensing pixel, a third sensing pixel, a fourth sensing pixel, a differential readout circuit, and a processing circuit. The light emitting module is configured to emit a light pulse to a sensing target, so that the sensing target reflects a reflected light pulse. The first sensing pixel is configured to perform sensing in a first cycle in a frame period to generate a first sensing signal. The second sensing pixel is configured to perform sensing in a second cycle in the frame period to generate a second sensing signal. The third sensing pixel is configured to perform sensing in a third cycle in the frame period to generate a third sensing signal. The fourth sensing pixel is configured to perform sensing in the third cycle in the frame period to generate a fourth sensing signal. The differential readout circuit is coupled to the first sensing pixel to the fourth sensing pixel. The differential readout circuit is configured to generate first digital data and second digital data according to the first sensing signal to the fourth sensing signal in the frame period. The processing circuit is coupled to the differential readout circuit. The processing circuit is configured to calculate a distance between the time-of-flight ranging device and the sensing target according to the first digital data and the second digital data.

Based on the above, the time-of-flight ranging device provided in one or more embodiments of the disclosure is suitable for indirect time-of-flight ranging and may respectively sense the reflected light pulse and the background light through different sensing pixels, so as to obtain the distance between the time-of-flight ranging device and the sensing target through indirect time-of-flight ranging calculation.

Several exemplary embodiments accompanied with figures are described in detail below to further describe the disclosure in details.

BRIEF DESCRIPTION OF THE DRAWINGS

Reference will now be made in detail to the embodiments of the disclosure, examples of which are illustrated in the accompanying drawings. Wherever possible, the same reference numbers are used in the drawings and the description to refer to the same or like parts.

DESCRIPTION OF THE EMBODIMENTS

Figure 1:
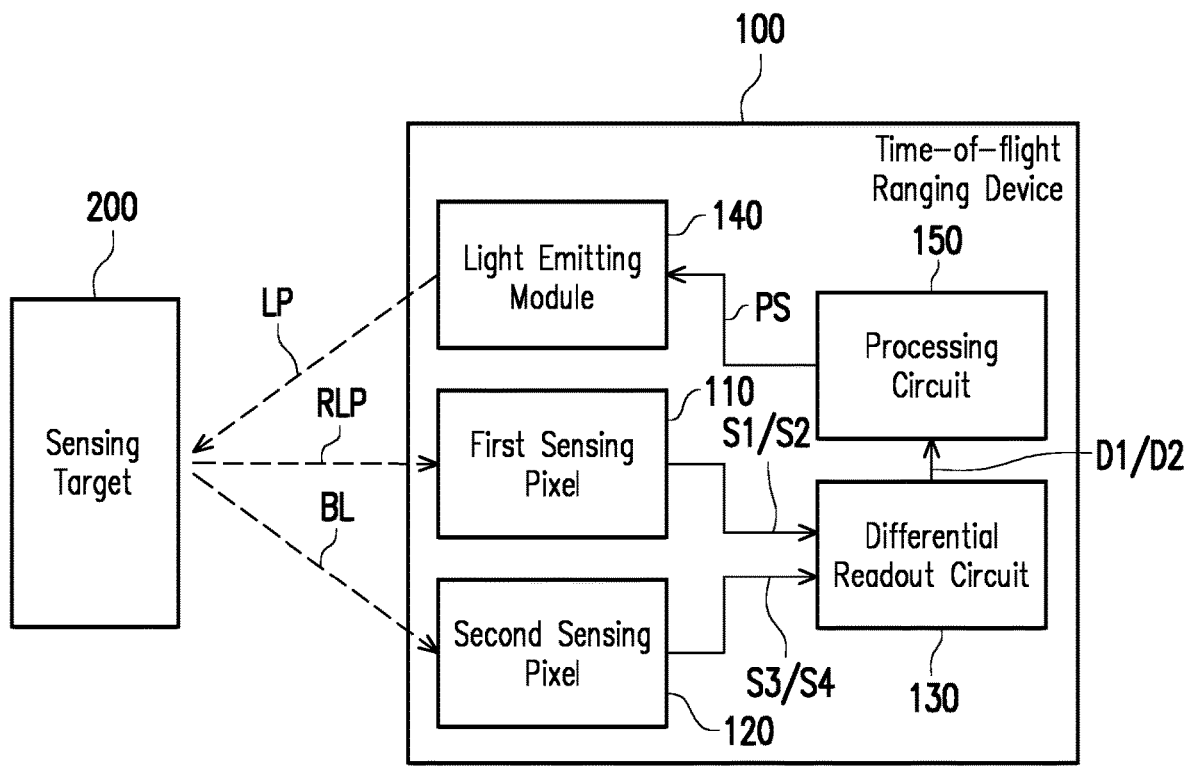
FIG. 1 is a schematic diagram of a time-of-flight ranging device according to an embodiment of the disclosure.

In order to make the content of the disclosure easier to understand, the following specific embodiments are provided as to how the disclosure can be implemented. In addition, wherever possible, the same reference numbers of components/elements/steps are used in the drawings and embodiments to represent the same or similar components/elements/steps.

FIG. 1 is a schematic diagram of a time-of-flight ranging device according to an embodiment of the disclosure. With reference to FIG. 1, the time-of-flight ranging device 100 includes a first sensing pixel 110, a second sensing pixel 120, a differential readout circuit 130, a light emitting module 140 and a processing circuit 150. The differential readout circuit 130 is coupled to the first sensing pixel 110, the second sensing pixel 120 and the processing circuit 150. The processing circuit 150 is coupled to the light emitting module 140. In the present embodiment, the processing circuit 150 may include, for example, a digital signal processor (DSP), a driver, a controller and other functional circuits. The processing circuit 150 may output a pulse signal PS to the light emitting module 140 to drive the light emitting module 140 to emit a light pulse LP to a sensing target 200, so that the sensing target 200 reflects a reflected light pulse RLP. The first sensing pixel 110 is configured to perform indirect time-of-flight ranging to generate a first sensing signal S1 and a second sensing signal S2. The second sensing pixel 120 performs sensing after the first sensing pixel 110 obtains the first sensing signal S1 and the second sensing signal S2 so as to generate a third sensing signal S3 and a fourth sensing signal S4 according to background light BL.

In the present embodiment, the differential readout circuit 130 subtracts background noise from the first sensing signal S1 by the third sensing signal S3, and subtracts background noise from the second sensing signal S2 by the fourth sensing signal S4. The differential readout circuit 130 generates first digital data D1 according to the first sensing signal S1 and the third sensing signal S3, and generates second digital data D2 according to the second sensing signal S2 and the fourth sensing signal S4. The processing circuit 150 may perform indirect time-of-flight ranging calculation according to the first digital data D1 and the second digital data D2 to obtain a distance between the time-of-flight ranging device 100 and the sensing target 200.

In the present embodiment, the light emitting module 140 may include one or a plurality of laser light sources, and the one or plurality of laser light sources may be, for example, a pulsed light emitter or a laser diode. The laser light source 120 may, for example, be configured to emit a light pulse of infrared radiation (IR) to the sensing target 200. In the present embodiment, the time-of-flight ranging device 100 may include a complementary metal oxide semiconductor image sensor (CMOS image sensor, CIS), and the image sensor includes a pixel array. The pixel array may include a plurality of first sensing pixels 110 and a plurality of second sensing pixels 120. In the present embodiment, the first sensing pixel 110 and the second sensing pixel 120 may include a photodiode, and the photodiode is configured to receive or sense a reflected light pulse of the infrared radiation reflected by the sensing target 200.

Figure 2:
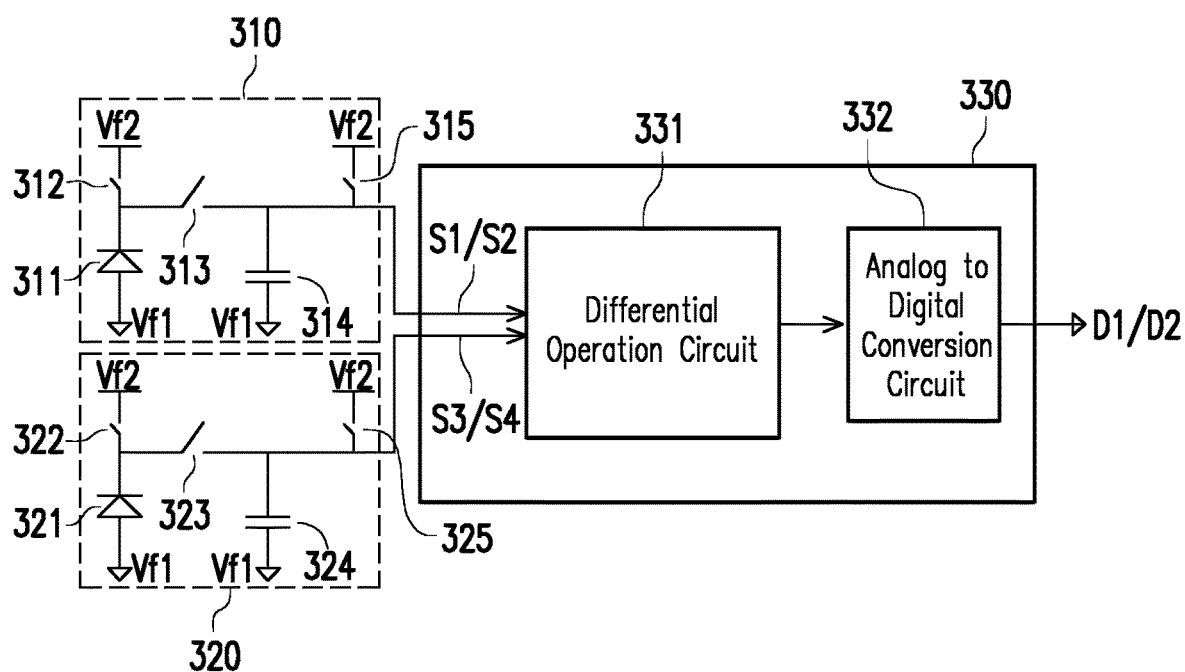
FIG. 2 is a schematic diagram of a first sensing pixel, a second sensing pixel, and a differential readout circuit according to an embodiment depicted in FIG. 1.

FIG. 2 is a schematic diagram of a first sensing pixel, a second sensing pixel, and a differential readout circuit according to an embodiment depicted in FIG. 1. The first sensing pixel 110, the second sensing pixel 120 and the differential readout circuit 130 depicted in FIG. 1 above may be a first sensing pixel 310, a second sensing pixel 320 and a differential readout circuit 330 depicted in FIG. 2. With reference to FIG. 2, the first sensing pixel 310 includes a photodiode 311, a reset switch 312, a readout switch 313, a storage capacitor 314 and a reset switch 315. A first terminal of the photodiode 311 is coupled to a first reference voltage Vf1. A first terminal of the reset switch 312 is coupled to a second reference voltage Vf2, and a second terminal of the reset switch 312 is coupled to a second terminal of the photodiode 311. A first terminal of the first readout switch 313 is coupled to the second terminal of the photodiode 311. A first terminal of the storage capacitor 314 is coupled to the first reference voltage Vf1, and a second terminal of the storage capacitor 314 is coupled to a second terminal of the first readout switch 313 and the differential readout circuit 330. A first terminal of the reset switch 315 is coupled to the second reference voltage Vf2, and a second terminal of the reset switch 315 is coupled to the second terminal of the storage capacitor 314. In the present embodiment, a full well of the storage capacitor 314 is greater than a full well of the photodiode 311. The full well of the photodiode 311 may be, for example, FW1, and the full well of the storage capacitor 314 may be, for example, FW2. In the present embodiment, FW2>N×FW1. N is a positive integer. That is, the full well of the storage capacitor 314 is greater than the full well of the photodiode 311, so that more exposures are performed to collect more charges. In other words, since the first sensing pixel 310 of the present embodiment may equivalently use N times the full well of the photodiode 311, the time-of-flight ranging device of the present embodiment may obtain a more accurate distance measurement result.

The second sensing pixel 320 includes a photodiode 321, a reset switch 322, a first readout switch 323, a storage capacitor 324 and a reset switch 325. A first terminal of the photodiode 321 is coupled to the first reference voltage Vf1. A first terminal of the reset switch 322 is coupled to the second reference voltage Vf2, and a second terminal of the reset switch 322 is coupled to a second terminal of the photodiode 321. A first terminal of the first readout switch 323 is coupled to the second terminal of the photodiode 321. A first terminal of the storage capacitor 324 is coupled to the first reference voltage Vf1, and a second terminal of the storage capacitor 324 is coupled to a second terminal of the first readout switch 323 and the differential readout circuit 330. A first terminal of the reset switch 325 is coupled to the second reference voltage Vf2, and a second terminal of the reset switch 325 is coupled to the second terminal of the storage capacitor 324. In the present embodiment, a full well of the storage capacitor 324 is greater than a full well of the photodiode 321. The full well of the photodiode 321 may be, for example, FW1, and the full well of the storage capacitor 324 may be, for example, FW2. In the present embodiment, FW2>N×FW1. N is a positive integer. That is, the full well of the storage capacitor 324 is greater than the full well of the photodiode 321, so that more exposures are performed to collect more charges. In other words, since the second sensing pixel 320 of the present embodiment may equivalently use N times the full well of the photodiode 321, the time-of-flight ranging device of the present embodiment may obtain a more accurate distance measurement result.

The differential readout circuit 330 includes a differential operation circuit 331 and an analog to digital (A/D) conversion circuit 332. A first input terminal of the differential operation circuit 331 is coupled to the second terminal of the storage capacitor 314 of the first sensing pixel 310. A second input terminal of the differential operation circuit 331 is coupled to the second terminal of the storage capacitor 324 of the second sensing pixel 320. The analog to digital conversion circuit 332 is coupled to the differential operation circuit 331. In the present embodiment, the differential operation circuit 331 may perform signal integration K times, and may equivalently use a full well of the photodiode 311 of K×N×FW1. Therefore, the time-of-flight ranging device of the present embodiment may obtain a more accurate distance measurement result. It should be particularly noted that for architecture of the traditional single-ended input operation circuit, when a signal received by the traditional operation circuit contains most of the background noise, a swing of an actual signal of the traditional operation circuit will be limited, thereby limiting a dynamic range of the operation circuit. In contrast, for the differential architecture of the disclosure, the differential operation circuit of the disclosure only performs operations (for example, integration, amplification and the like) on the difference of input signals, so the differential operation circuit of the disclosure may have a larger signal swing and may obtain a higher dynamic range.

Figure 3A:
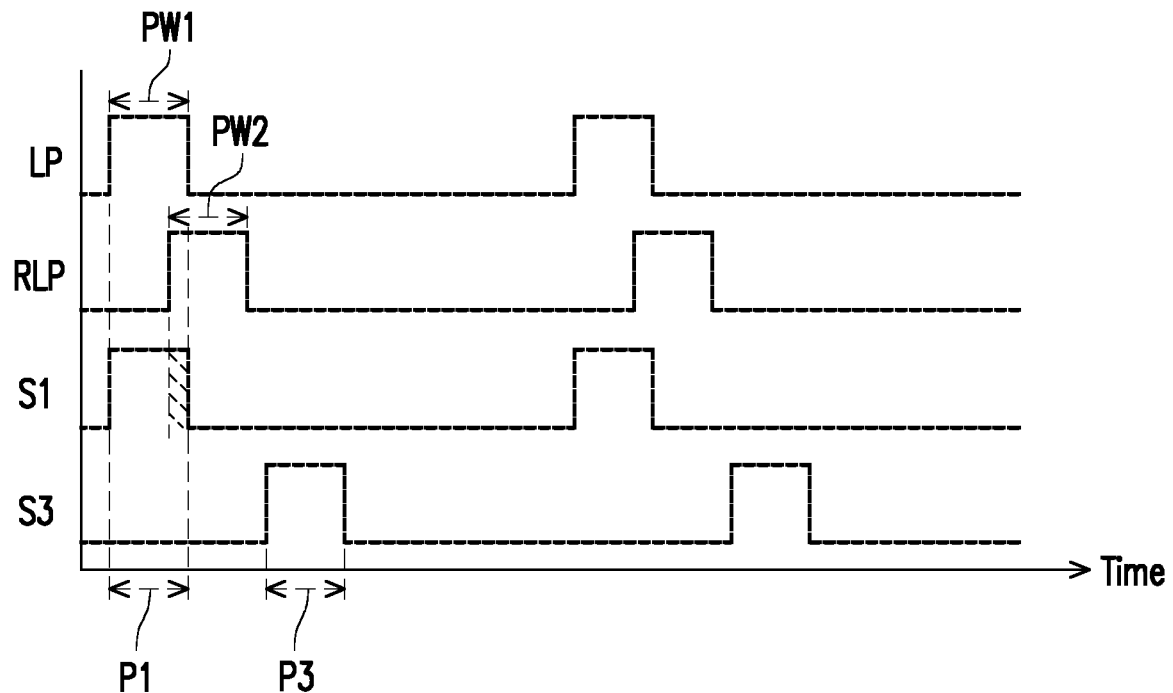
FIG. 3A is a timing diagram in a first frame period according to the embodiment depicted in FIG. 2.
Figure 3B:
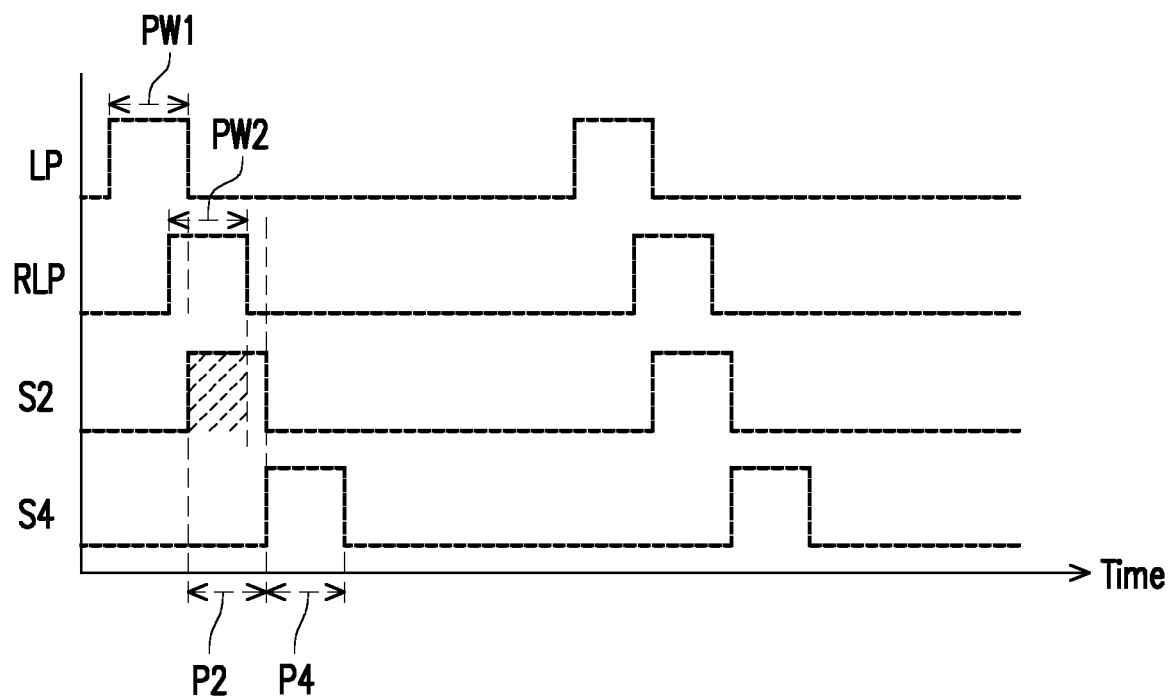
FIG. 3B is a timing diagram in a second frame period according to the embodiment depicted in FIG. 2.

FIG. 3A is a timing diagram in a first frame period according to the embodiment depicted in FIG. 2. FIG. 3B is a timing diagram in a second frame period according to the embodiment depicted in FIG. 2. With reference to FIG. 2 and FIG. 3A, when the light emitting module emits a light pulse LP to the sensing target so that the sensing target reflects a reflected light pulse RLP, in the first frame period, the reset switch 312, the readout switch 313 and the reset switch 315 may be switched, so that the photodiode 311 stores charges stored by a part of the received reflected light pulse RLP to the storage capacitor 314, and provides a first sensing signal S1 to the first input terminal of the differential operation circuit 331 via the storage capacitor 314. The disclosure does not limit the switching timing of the reset switch 312, the readout switch 313 and the reset switch 315. Besides, the reset switch 322, the readout switch 323 and the reset switch 325 may be switched, so that the photodiode 321 stores charges stored by the received background light to the storage capacitor 324, and provides a third sensing signal S3 to the second input terminal of the differential operation circuit 331 via the storage capacitor 324. The disclosure does not limit the switching timing of the reset switch 322, the readout switch 323 and the reset switch 325.

Specifically, the photodiode 311 of the first sensing pixel 310 performs image integration in a first cycle P1 in the first frame period. The first cycle P1 is synchronized with a first pulse cycle PW1 of the light pulse LP. As shown in FIG. 3A, the photodiode 311 may sense the background light and a part of the reflected light pulse RLP (for example, the shaded area of S1) in the first cycle P1. Therefore, the first sensing pixel 310 may provide the first sensing signal S1 to the first input terminal of the differential operation circuit 331. Next, the photodiode 321 of the second sensing pixel 320 performs image integration in a third cycle P3 in the first frame period. The first cycle P1 and the third cycle P3 have a same cycle length, and the third cycle P3 does not overlap and is adjacent to a second pulse cycle PW2 of the reflected light pulse RLP, so the photodiode 311 may sense the same or similar background light in the first cycle P1 and the third cycle P3. Therefore, the second sensing pixel 320 may provide the third sensing signal S3 to the second input terminal of the differential operation circuit 331. The third sensing signal S3 is a pure background signal.

In the present embodiment, the differential operation circuit 331 may perform subtraction (voltage subtraction) on the first sensing signal S1 and the third sensing signal S3 to generate a first differential signal. The differential operation circuit 331 provides the first differential signal to the analog to digital conversion circuit 332 to output a first digital signal D1. In other words, the differential readout circuit 330 of the present embodiment may provide a sensing value of a part of the reflected light pulse RLP with the background noise removed in the first frame period.

With reference to FIG. 2 and FIG. 3B, when the light emitting module emits a light pulse LP to the sensing target so that the sensing target reflects a reflected light pulse RLP, in the second frame period, the reset switch 312, the readout switch 313 and the reset switch 315 may be switched, so that the photodiode 311 stores charges stored by another part of the received reflected light pulse RLP to the storage capacitor 314, and provides a second sensing signal S2 to the first input terminal of the differential operation circuit 331 via the storage capacitor 314. The disclosure does not limit the switching timing of the reset switch 312, the readout switch 313 and the reset switch 315. Besides, the reset switch 322, the readout switch 323 and the reset switch 325 may be switched, so that the photodiode 321 stores charges stored by the received background light to the storage capacitor 324, and provides a fourth sensing signal S4 to the second input terminal of the differential operation circuit 331 via the storage capacitor 324. The disclosure does not limit the switching timing of the reset switch 322, the readout switch 323 and the reset switch 325.

Specifically, the photodiode 311 of the first sensing pixel 310 performs image integration in a second cycle P2 in the second frame period. A rising edge of the second cycle P2 follows a falling edge of the light pulse LP. As shown in FIG. 3B, the photodiode 311 may sense the background light and another part of the reflected light pulse RLP (for example, the shaded area of S2) in the second cycle P2. Therefore, the first sensing pixel 310 may provide the second sensing signal S2 to the first input terminal of the differential operation circuit 331. Next, the photodiode 321 of the second sensing pixel 320 performs image integration in a fourth cycle P4 in the second frame period. The second cycle P2 and the fourth cycle P4 have a same cycle length, the fourth cycle P4 does not overlap and is adjacent to a second pulse cycle PW2 of the reflected light pulse RLP, and the fourth cycle P4 even does not overlap the second cycle P2, so the photodiode 311 may sense the same or similar background light in the second cycle P2 and the fourth cycle P4. Therefore, the second sensing pixel 320 may provide the fourth sensing signal S4 to the second input terminal of the differential operation circuit 331. The fourth sensing signal S4 is a pure background signal.

In the present embodiment, the differential operation circuit 331 may perform subtraction (voltage subtraction) on the second sensing signal S2 and the fourth sensing signal S4 to generate a second differential signal. The differential operation circuit 331 provides the second differential signal to the analog to digital conversion circuit 332 to output a second digital signal D2. In other words, the differential readout circuit 330 of the present embodiment may provide a sensing value of another part of the reflected light pulse RLP with the background noise removed in the second frame period.

In the present embodiment, the analog to digital conversion circuit 332 may provide a first digital signal D1 and a second digital signal D2 to a back-end digital signal processing circuit (for example, the processing circuit 150 depicted in FIG. 1 as described above), so that the digital signal processing circuit may perform indirect time-of-flight ranging calculation according to the following formula (1) based on the first digital signal D1 and the second digital signal D2. Here, d is a distance, c is a speed of light, and t is a pulse width of the first pulse cycle PW1. However, the calculation manner of the indirect time-of-flight ranging of the disclosure is not limited to this.

$$d = \frac{1}{2} \times c \times t \times \frac{D2}{D1 + D2}. \quad \text{Formula (1)}$$

Therefore, the differential readout circuit 330 of the present embodiment may effectively provide the sensing result of the reflected light pulse RLP with the background value removed, so that the back-end digital signal processing circuit may effectively calculate the accurate distance. In addition, a full well of the storage capacitors 314, 324 of the present embodiment is greater than a full well of the photodiodes 311, 321. Therefore, compared with the traditional design in which the full well of the storage capacitor is equal to the full well of the photodiode, the storage capacitors 314, 324 of the disclosure may store the sensing results of more reflected light pulses. In addition, the differential operation circuit 331 may further perform signal integration to provide a sensing result with a large dynamic range. For example, the sensing result of M pulses or background light may correspond to the charge amount FW1, and the storage capacitors 314, 324 may store a charge amount N×FW1 corresponding to the sensing result of M×N pulses or M×N times of background light in one frame period.

Figure 4:
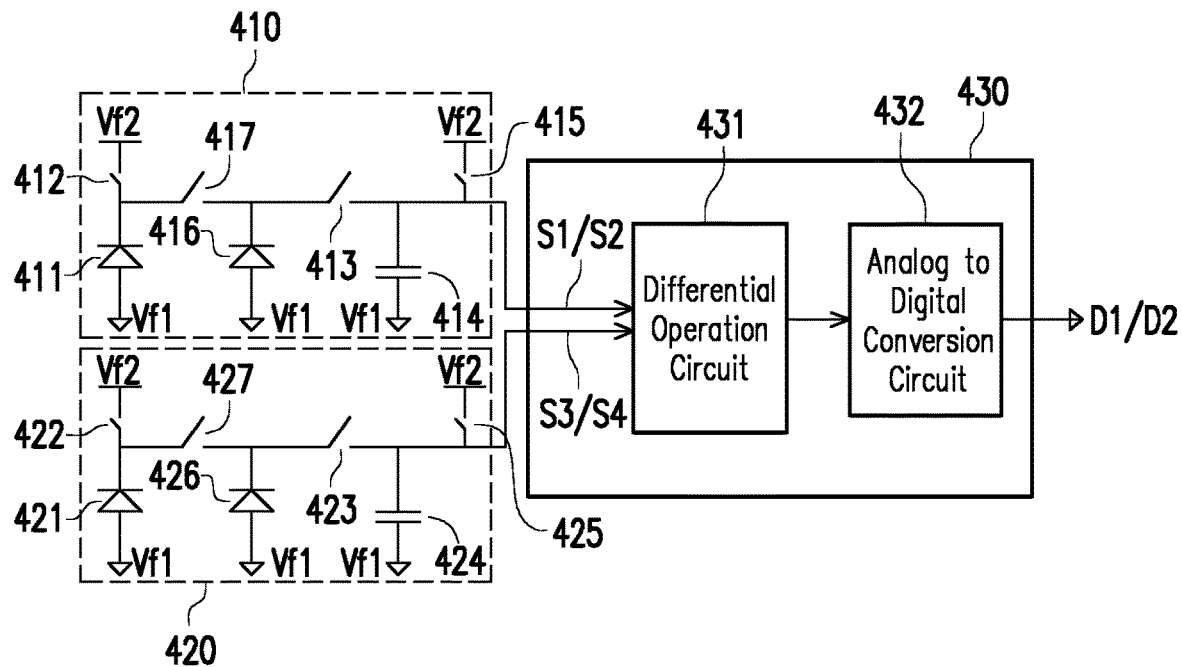
FIG. 4 is a schematic diagram of a first sensing pixel, a second sensing pixel, and a differential readout circuit according to another embodiment depicted in FIG. 1.

FIG. 4 is a schematic diagram of a first sensing pixel, a second sensing pixel, and a differential readout circuit according to another embodiment depicted in FIG. 1. The first sensing pixel 110, the second sensing pixel 120, and the differential readout circuit 130 depicted in FIG. 1 above may be a first sensing pixel 410, a second sensing pixel 420 and a differential readout circuit 430 depicted in FIG. 4. With reference to FIG. 4, the first sensing pixel 410 includes a photodiode 411, a reset switch 412, a readout switch 413, a storage capacitor 414, a reset switch 415, a diode 416 and a readout switch 417. A first terminal of the photodiode 411 is coupled to a first reference voltage Vf1. A first terminal of the reset switch 412 is coupled to a second reference voltage Vf2, and a first terminal of the readout switch 417 is coupled to a second terminal of the photodiode 411. A first terminal of the diode 416 is coupled to the first reference voltage Vf1, and a second terminal of the diode 416 is coupled to a first terminal of the readout switch 413. A first terminal of the storage capacitor 414 is coupled to the first reference voltage Vf1, and a second terminal of the storage capacitor 414 is coupled to a second terminal of the readout switch 413 and the differential readout circuit 430. A first terminal of the reset switch 415 is coupled to the second reference voltage Vf2, and a second terminal of the reset switch 415 is coupled to the second terminal of the storage capacitor 414. In the present embodiment, the diode 416 may be used as a storage node, and a full well of the diode 416 is greater than a full well of the photodiode 411. A full well of the storage capacitor 414 is greater than a full well of the photodiode 411. The full well of the photodiode 411 may be, for example, FW, and the full wells of the storage capacitor 414 and the diode 416 may respectively be, for example, FW2 and FW3. In the present embodiment, FW2>N×FW1, and FW3>N×FW1. N is a positive integer. That is, more exposures may be performed on the first sensing pixel 410 to collect more charges. In other words, since the first sensing pixel 410 of the present embodiment may equivalently use N times the full well of the photodiode 411, the time-of-flight ranging device of the present embodiment may obtain a more accurate distance measurement result. It should be particularly noted that when charges are stored in the diode 416, the storage capacitor 414 may be reset without affecting the diode 416. Therefore, the first sensing pixel 410 of the present embodiment may perform a true correlated double sampling (true CDS) or true double delta sampling (true DDS) operation.

The second sensing pixel 420 includes a photodiode 421, a reset switch 422, a readout switch 423, a storage capacitor 424, a reset switch 425, a diode 426, and a readout switch 427. A first terminal of the photodiode 421 is coupled to the first reference voltage Vf1. A first terminal of the reset switch 422 is coupled to the second reference voltage Vf2, and a first terminal of the readout switch 427 is coupled to a second terminal of the photodiode 421. A first terminal of the diode 426 is coupled to the first reference voltage Vf1, and a second terminal of the diode 426 is coupled to a first terminal of the readout switch 423. A first terminal of the storage capacitor 424 is coupled to the first reference voltage Vf1, and a second terminal of the storage capacitor 424 is coupled to a second terminal of the readout switch 423 and the differential readout circuit 430. A first terminal of the reset switch 425 is coupled to the second reference voltage Vf2, and a second terminal of the reset switch 425 is coupled to the second terminal of the storage capacitor 424. In the present embodiment, the diode 426 may be used as a storage node, and a full well of the diode 426 is greater than a full well of the photodiode 421. A full well of the storage capacitor 424 is greater than a full well of the photodiode 421. The full well of the photodiode 421 may be, for example, FW, and the full wells of the storage capacitor 424 and the diode 426 may respectively be, for example, FW2 and FW3. In the present embodiment, FW2>N×FW1, and FW3>N×FW1. N is a positive integer. That is, more exposures may be performed on the second sensing pixel 420 to collect more charges. In other words, since the second sensing pixel 420 of the present embodiment may equivalently use N times the full well of the photodiode 421, the time-of-flight ranging device of the present embodiment may obtain a more accurate distance measurement result. It should be particularly noted that when charges are stored in the diode 426, the storage capacitor 424 may be reset without affecting the diode 426. Therefore, the second sensing pixel 420 of the present embodiment may perform a true correlated double sampling (true CDS) or true double delta sampling (true DDS) operation.

The differential readout circuit 430 includes a differential operation circuit 431 and an analog to digital conversion circuit 432. A first input terminal of the differential operation circuit 431 is coupled to a second terminal of the storage capacitor 414 of the first sensing pixel 410. A second input terminal of the differential operation circuit 431 is coupled to the second terminal of the storage capacitor 424 of the second sensing pixel 420. The analog to digital conversion circuit 432 is coupled to the differential operation circuit 431. In the present embodiment, the first sensing pixel 410, the second sensing pixel 420 and the differential readout circuit 430 may perform the image integration depicted in FIG. 3A and FIG. 3B described above to generate the first sensing signal S1 to the fourth sensing signal S4 to the differential operation circuit 431 of the differential readout circuit 430. The differential operation circuit 431 may output the first differential signal and the second differential signal to the analog to digital conversion circuit 432 according to the first sensing signal S1 to the fourth sensing signal S4, so that the analog to digital conversion circuit 432 outputs a first digital signal D1 and a second digital signal D1.

Compared with the embodiment depicted in FIG. 2 above, the first sensing pixel 410 and the second sensing pixel 420 provided in the present embodiment may accumulate and store real sensing results of the photodiodes 411, 421 through the diodes 416, 426, and provide charge accumulation results to the storage capacitors 414, 424. It should be particularly noted that when the storage capacitors 414, 424 are reset, the diodes 416, 426 may not be affected by the reset. Therefore, the first sensing pixel 410 and the second sensing pixel 420 may perform true correlated double sampling (true CDS) or true double delta sampling (true DDS). Besides, since multiple exposures may be continuously performed on the first sensing pixel 410 and the second sensing pixel 420 and the differential operation circuit 331 may perform signal integration, a sensing result with a larger dynamic range may be provided. For example, the sensing result of M pulses or background light may correspond to the charge amount FW1, and the diodes 416, 426 and the storage capacitors 414, 424 may store a charge amount N×FW1 corresponding to the sensing result of N×M pulses or N×M times of background light in one frame period. Besides, the differential operation circuit 331 may perform image integration K times, and the charge amount corresponding to the image integration result may be K×N×FW1. K is a positive integer. In other words, compared with the traditional architecture, the equivalent FW1 of the disclosure becomes K×N times.

However, for the actuating relationship between the components of the present embodiment, reference may be made to the description of the embodiments depicted in FIG. 1 to FIG. 3 above to obtain sufficient teachings, suggestions and implementation description, so details will not be repeated here.

Figure 5:
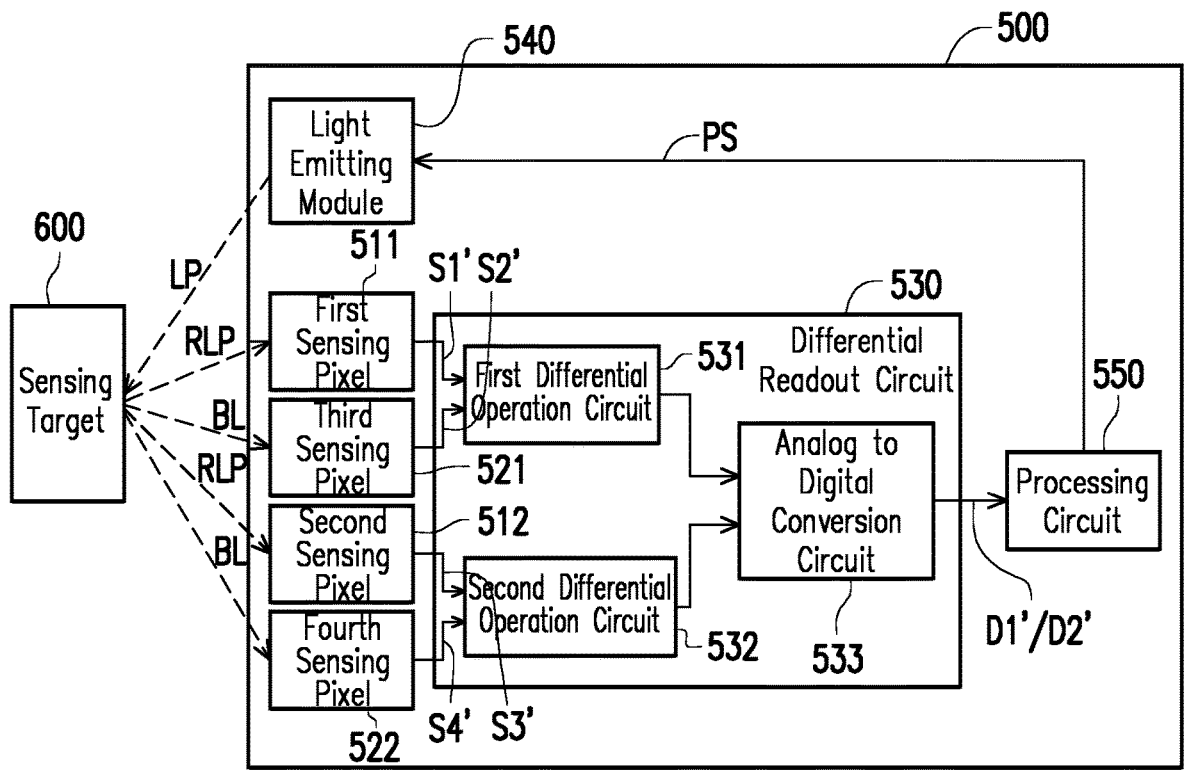
FIG. 5 is a schematic diagram of a time-of-flight ranging device according to an embodiment of the disclosure.

FIG. 5 is a schematic diagram of a time-of-flight ranging device according to an embodiment of the disclosure. With reference to FIG. 5, the time-of-flight ranging device 500 includes a first sensing pixel 511, a second sensing pixel 512, a third sensing pixel 521, a fourth sensing pixel 522, a differential readout circuit 530, a light emitting module 540 and a processing circuit 550. The differential readout circuit 530 includes a first differential operation circuit 531, a second differential operation circuit 532 and an analog to digital conversion circuit 533. The differential readout circuit 530 is coupled to the first sensing pixel 511, the second sensing pixel 512, the third sensing pixel 521, the fourth sensing pixel 522 and the processing circuit 550. The processing circuit 550 is coupled to the light emitting module 540. The first sensing pixel 511 and the third sensing pixel 521 are coupled to a first input terminal and a second input terminal of the first differential operation circuit 531. An output terminal of the first differential operation circuit 531 is coupled to the analog to digital conversion circuit 533. The second sensing pixel 512 and the fourth sensing pixel 522 are coupled to a first input terminal and a second input terminal of the second differential operation circuit 532. An output terminal of the second differential operation circuit 532 is coupled to the analog to digital conversion circuit 533.

It is worth noting that the second sensing pixel 512, the fourth sensing pixel 522 and the second differential operation circuit 532 may correspond to circuits of the first sensing pixel 310, the second sensing pixel 320, and the differential operation circuit 331 in the embodiment depicted in FIG. 2 as described above, or correspond to circuit forms of the first sensing pixel 410, the second sensing pixel 420, and the differential operation circuit 431 in the embodiment depicted in FIG. 4 as described above. The first sensing pixel 511, the third sensing pixel 521 and the first differential operation circuit 531 may correspond to circuits of the first sensing pixel 310, the second sensing pixel 320, and the differential operation circuit 331 in the embodiment depicted in FIG. 2 as described above, or correspond to circuit forms of the first sensing pixel 410, the second sensing pixel 420, and the differential operation circuit 431 in the embodiment depicted in FIG. 4 as described above.

In the present embodiment, the processing circuit 550 may include, for example, a digital signal processor, a driver, a controller and other functional circuits. The processing circuit 550 may output a pulse signal PS to the light emitting module 540 to drive the light emitting module 540 to emit a light pulse LP to a sensing target 600, so that the sensing target 600 reflects a reflected light pulse RLP. The first sensing pixel 511 and the second sensing pixel 512 are configured to perform indirect time-of-flight ranging to generate a first sensing signal S1' and a second sensing signal S2'. The third sensing pixel 521 and the fourth sensing pixel 522 perform sensing respectively after the first sensing pixel 110 and the second sensing pixel 512 obtain the first sensing signal S1' and the second sensing signal S2' so as to generate a third sensing signal S3' and a fourth sensing signal S4' according to background light BL.

In the present embodiment, the first differential operation circuit 531 subtracts background noise from the first sensing signal S1' by the third sensing signal S3', and the second differential operation circuit 532 subtracts background noise from the second sensing signal S2' by the fourth sensing signal S4'. The first differential operation circuit 531 generates first digital data D1' according to the first sensing signal S1' and the third sensing signal S3', and the second differential operation circuit 532 generates second digital data D2' according to the second sensing signal S2' and the fourth sensing signal S4'. The processing circuit 550 may perform indirect time-of-flight ranging calculation according to the first digital data D1' and the second digital data D2' to obtain a distance between the time-of-flight ranging device 500 and the sensing target 600.

However, for the circuit features and the actuating relationship between the components of the present embodiment, reference may be made to the description of the embodiments depicted in FIG. 1 to FIG. 4 above to obtain sufficient teachings, suggestions and implementation description, and thus so details will not be repeated here.

Figure 6:
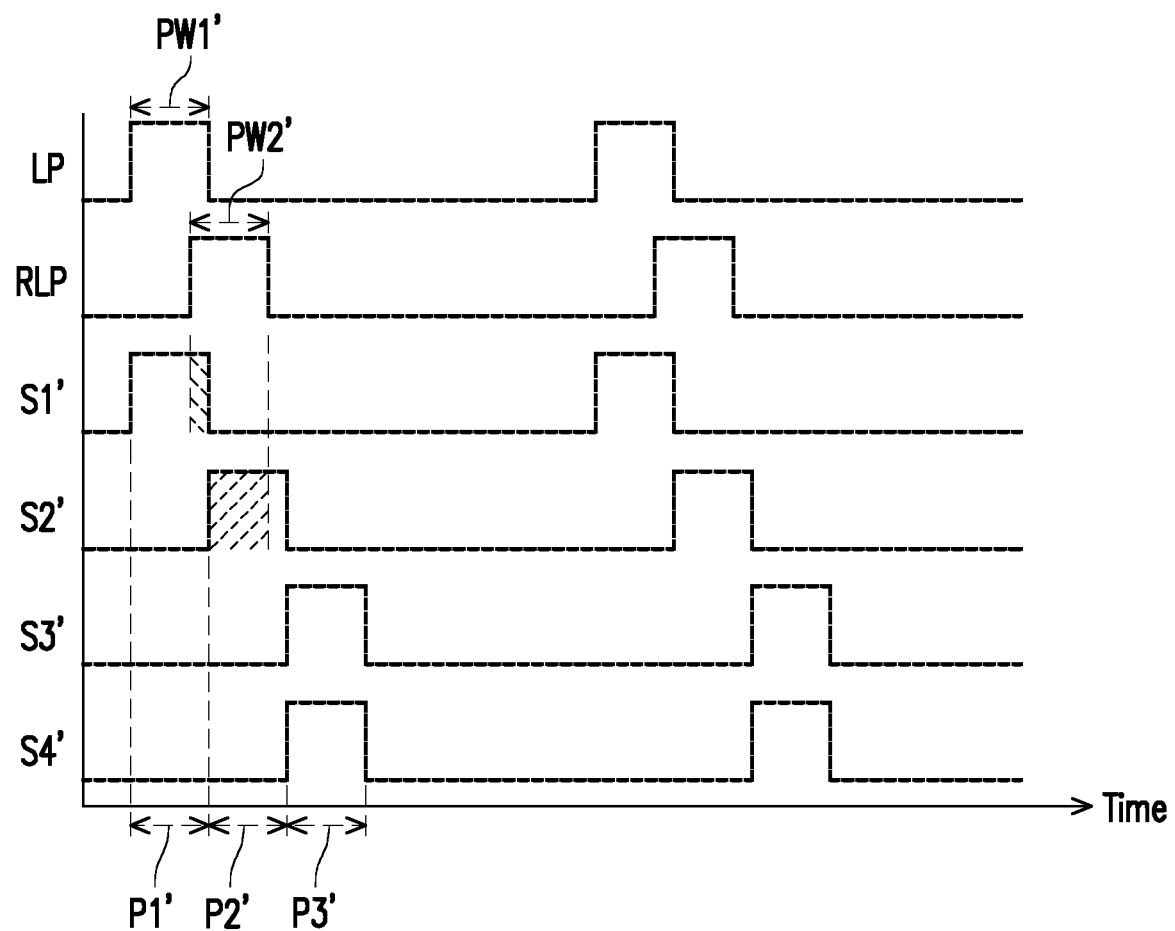
FIG. 6 is a timing diagram in a frame period according to the embodiment depicted in FIG. 5.

FIG. 6 is a timing diagram in a frame period according to the embodiment depicted in FIG. 5. With reference to FIG. 5 and FIG. 6, when the light emitting module emits a light pulse LP to the sensing target so that the sensing target reflects a reflected light pulse RLP, the photodiode of the first sensing pixel 511 performs image integration in a first cycle P1' in a frame period. The first cycle P1' is synchronized with a first pulse cycle PW1' of the light pulse LP. As shown in FIG. 6, the photodiode of the first sensing pixel 511 may sense the background light and a part of the reflected light pulse RLP (for example, the shaded area of S1') in the first cycle P1'. Therefore, the first sensing pixel 511 may provide the first sensing signal S1' to the first input terminal of the first differential operation circuit 531. Next, the photodiode of the second sensing pixel 512 performs image integration in a second cycle P2' in the same frame period. A rising edge of the second cycle P2' follows a falling edge of the first cycle P1'. As shown in FIG. 6, the photodiode of the second sensing pixel 512 may sense the background light and another part of the reflected light pulse RLP (for example, the shaded area of S2') in the second cycle P2'. Therefore, the second sensing pixel 512 may provide the second sensing signal S2' to the first input terminal of the second differential operation circuit 532. Next, the photodiodes of the third sensing pixel 521 and the fourth sensing pixel 522 may respectively perform image integration in a third cycle P3' in the same frame period to respectively provide the third sensing signal S3' and the fourth sensing signal S4' to the second input terminal of the first differential operation circuit 531 and the second input terminal of the second differential operation circuit 532.

In the present embodiment, the first cycle P1', the second cycle P2' and the third cycle P3' have a same cycle length. The third cycle P3' does not overlap and is adjacent to a second pulse cycle PW2' of the reflected light pulse RLP, so the photodiodes of the third sensing pixel 521 and the fourth sensing pixel 522 may sense in the third cycle P3' the background light that is the same as or similar to the background light respectively sensed by the first sensing pixel 511 and the second sensing pixel 512 in the first cycle P1' and the second cycle P2'. Therefore, the third sensing pixel 521 and the fourth sensing pixel 522 may provide the third sensing signal S3' and the fourth sensing signal S4' to the second input terminal of the first differential operation circuit 531 and the second input terminal of the second differential operation circuit 532. The third sensing signal S3' and the fourth sensing signal S4' are respectively a pure background signal.

In the present embodiment, the first differential operation circuit 531 may perform subtraction (voltage subtraction) on the first sensing signal S1' and the third sensing signal S3' to generate a first differential signal. The second differential operation circuit 532 may perform subtraction (voltage subtraction) on the second sensing signal S2' and the fourth sensing signal S4' to generate a second differential signal. The first differential operation circuit 531 may first provide the first differential signal to the analog to digital conversion circuit 533, so that the analog to digital conversion circuit 533 outputs a first digital signal D1'. Next, the second differential operation circuit 532 provides the second differential signal to the analog to digital conversion circuit 533, so that the analog to digital conversion circuit 533 outputs a second digital signal D2'. In other words, the time-of-flight ranging device 500 of the present embodiment may simultaneously perform ranging sensing and background light sensing in one frame period, so that a sensing frame rate of indirect time-of-flight ranging of the time-of-flight ranging device 500 may be improved.

Therefore, the differential readout circuit 530 of the present embodiment can complete the indirect time-of-flight ranging sensing once within one frame period, and can effectively remove or reduce the effect of the background noise on the sensing result, so that the back-end digital signal processing circuit can effectively calculate the accurate distance. However, for the calculation manner of the distance in the present embodiment, reference may be made to the illustration of formula (1) in the embodiment above to obtain sufficient teachings, suggestions and implementation description, so details will not be repeated here.

To sum up, the time-of-flight ranging device provided in one or more embodiments of the disclosure may effectively perform indirect time-of-flight ranging and may effectively eliminate the impact of the background noise, so as to accurately obtain the distance between the time-of-flight ranging device and the sensing target after calculation based on the sensing signal after the background is removed.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A time-of-flight ranging device suitable for indirect time-of-flight ranging, wherein the time-of-flight ranging device comprises:
   a light emitting module, configured to emit a light pulse to a sensing target, so that the sensing target reflects a reflected light pulse;
   a first sensing pixel, configured to respectively perform sensing in a first cycle in a first frame period and a second cycle in a second frame period to respectively generate a first sensing signal and a second sensing signal;
   a second sensing pixel, configured to respectively perform sensing in a third cycle in the first frame period and a fourth cycle in the second frame period to respectively generate a third sensing signal and a fourth sensing signal, wherein the third sensing signal and the fourth sensing signal are respectively a background signal;
   a differential readout circuit, coupled to the first sensing pixel and the second sensing pixel and configured to generate first digital data according to the first sensing signal and the third sensing signal in the first frame period and generate second digital data according to the second sensing signal and the fourth sensing signal in the second frame period; and
   a processing circuit, coupled to the differential readout circuit and configured to calculate a distance between the time-of-flight ranging device and the sensing target according to the first digital data and the second digital data.

2. The time-of-flight ranging device according to claim 1, wherein the first cycle is synchronized with a first pulse cycle of the light pulse.

3. The time-of-flight ranging device according to claim 1, wherein the first cycle and the third cycle have a same cycle length, and the second cycle and the fourth cycle have a same cycle length.

4. The time-of-flight ranging device according to claim 1, wherein the third cycle and a second pulse cycle of the reflected light pulse are not overlapped, and the fourth cycle and the second pulse cycle of the reflected light pulse are not overlapped.

5. The time-of-flight ranging device according to claim 1, wherein the differential readout circuit comprises a differential operation circuit, a first input terminal of the differential operation circuit is coupled to the first sensing pixel, and a second input terminal of the differential operation circuit is coupled to the second sensing pixel, wherein the differential operation circuit is configured to perform subtraction on the first sensing signal and the third sensing signal in the first frame period to output a first differential signal, and the differential operation circuit is configured to perform subtraction on the second sensing signal and the fourth sensing signal in the second frame period to output a second differential signal.

6. The time-of-flight ranging device according to claim 5, wherein the differential readout circuit further comprises an analog to digital conversion circuit coupled to the differential operation circuit, the analog to digital conversion circuit is configured to convert the first differential signal into the first digital signal in the first frame period, and the analog to digital conversion circuit is configured to convert the second differential signal into the second digital signal in the second frame period.

7. The time-of-flight ranging device according to claim 1, wherein each of the first sensing pixel and the second sensing pixel comprises:
 a photodiode, wherein a first terminal of the photodiode is coupled to a first reference voltage;
 a first reset switch, wherein a first terminal of the first reset switch is coupled to a second reference voltage, and a second terminal of the first reset switch is coupled to a second terminal of the photodiode;
 a first readout switch, wherein a first terminal of the first readout switch is coupled to the second terminal of the photodiode;
 a storage capacitor, wherein a first terminal of the storage capacitor is coupled to the first reference voltage, and a second terminal of the storage capacitor is coupled to a second terminal of the first readout switch and the differential readout circuit; and
 a second reset switch, wherein a first terminal of the second reset switch is coupled to a third reference voltage, and a second terminal of the second reset switch is coupled to the second terminal of the storage capacitor.

8. The time-of-flight ranging device according to claim 7, wherein a full well of the storage capacitor is greater than a full well of the photodiode.

9. The time-of-flight ranging device according to claim 7, wherein each of the first sensing pixel and the second sensing pixel further comprises:
 a diode, wherein a first terminal of the diode is coupled to the first reference voltage, and a second terminal of the diode is coupled to the first terminal of the first readout switch; and
 a second readout switch, wherein a first terminal of the second readout switch is coupled to the second terminal of the photodiode, and a second terminal of the second readout switch is coupled to the second terminal of the diode and the first terminal of the first readout switch.

10. The time-of-flight ranging device according to claim 9, wherein a full well of the diode is greater than a full well of the photodiode.

11. A time-of-flight ranging device suitable for indirect time-of-flight ranging, wherein the time-of-flight ranging device comprises:
 a light emitting module, configured to emit a light pulse to a sensing target, so that the sensing target reflects a reflected light pulse;
 a first sensing pixel, configured to perform sensing in a first cycle in a frame period to generate a first sensing signal;
 a second sensing pixel, configured to perform sensing in a second cycle in the frame period to generate a second sensing signal;
 a third sensing pixel, configured to perform sensing in a third cycle in the frame period to generate a third sensing signal;
 a fourth sensing pixel, configured to respectively perform sensing in the third cycle in the frame period to generate a fourth sensing signal, wherein the third sensing signal and the fourth sensing signal are respectively a background signal;
 a differential readout circuit, coupled to the first sensing pixel to the fourth sensing pixel and configured to generate first digital data and second digital data according to the first sensing signal to the fourth sensing signal in the frame period; and
 a processing circuit, coupled to the differential readout circuit and configured to calculate a distance between the time-of-flight ranging device and the sensing target according to the first digital data and the second digital data.

12. The time-of-flight ranging device according to claim 11, wherein the first cycle is synchronized with a first pulse cycle of the light pulse.

13. The time-of-flight ranging device according to claim 11, wherein the first cycle, the second cycle, and the third cycle have a same cycle length.

14. The time-of-flight ranging device according to claim 11, wherein the third cycle and a second pulse cycle of the reflected light pulse are not overlapped.

15. The time-of-flight ranging device according to claim 11, wherein the differential readout circuit comprises:
 a first differential operation circuit, wherein a first input terminal of the first differential operation circuit is coupled to the first sensing pixel, and a second input terminal of the first differential operation circuit is coupled to the third sensing pixel, wherein the first differential operation circuit is configured to perform subtraction on the first sensing signal and the third sensing signal in the frame period to output a first differential signal; and
 a second differential operation circuit, wherein a first input terminal of the second differential operation circuit is coupled to the second sensing pixel, and a second input terminal of the second differential operation circuit is coupled to the fourth sensing pixel, wherein the second differential operation circuit is configured to perform subtraction on the second sensing signal and the fourth sensing signal in the frame period to output a second differential signal.

16. The time-of-flight ranging device according to claim 15, wherein the differential readout circuit further comprises an analog to digital conversion circuit coupled to the first differential operation circuit and the second differential operation circuit, and the analog to digital conversion circuit is configured to convert the first differential signal into the first digital signal and the second differential signal into the second digital signal in the frame period.

17. The time-of-flight ranging device according to claim 16, wherein each of the first sensing pixel, the second sensing pixel, the third sensing pixel, and the fourth sensing pixel comprises:
 a photodiode, wherein a first terminal of the photodiode is coupled to a first reference voltage;
 a first reset switch, wherein a first terminal of the first reset switch is coupled to a second reference voltage, and a second terminal of the first reset switch is coupled to a second terminal of the photodiode;
 a first readout switch, wherein a first terminal of the first readout switch is coupled to the second terminal of the photodiode;
 a storage capacitor, wherein a first terminal of the storage capacitor is coupled to the first reference voltage, and a second terminal of the storage capacitor is coupled to a second terminal of the first readout switch and the differential readout circuit; and a second reset switch, wherein a first terminal of the second reset switch is coupled to a third reference voltage, and a second terminal of the second reset switch is coupled to the second terminal of the storage capacitor.

18. The time-of-flight ranging device according to claim 17, wherein a full well of the storage capacitor is greater than a full well of the photodiode.

19. The time-of-flight ranging device according to claim 17, wherein each of the first sensing pixel and the second sensing pixel further comprises:

a diode, wherein a first terminal of the diode is coupled to the first reference voltage, and a second terminal of the diode is coupled to the first terminal of the first readout switch; and a second readout switch, wherein a first terminal of the second readout switch is coupled to the second terminal of the photodiode, and a second terminal of the second readout switch is coupled to the second terminal of the diode and the first terminal of the first readout switch.

20. The time-of-flight ranging device according to claim 19, wherein a full well of the diode is greater than a full well of the photodiode.

* * * * *